United States Patent
Titmas

(10) Patent No.: US 7,189,328 B1
(45) Date of Patent: Mar. 13, 2007

(54) METHOD FOR EXTRACTION OF DISSOLVED TRACE MATERIALS FROM SOLUTION

(75) Inventor: James A. Titmas, Cuyahoga Falls, OH (US)

(73) Assignee: Eau-Viron Incorporated, Hudson, OH (US)

( * ) Notice: Subject to any disclaimer, the term of this patent is extended or adjusted under 35 U.S.C. 154(b) by 291 days.

(21) Appl. No.: 10/877,745

(22) Filed: Jun. 25, 2004

(51) Int. Cl.
C02F 1/04 (2006.01)
C02F 1/22 (2006.01)

(52) U.S. Cl. .............. 210/714; 23/295 R; 62/532; 62/544; 159/47.3; 210/737; 210/774

(58) Field of Classification Search ............... 210/737
See application file for complete search history.

(56) References Cited

U.S. PATENT DOCUMENTS

| | | | |
|---|---|---|---|
| 4,355,520 A * | 10/1982 | Kobayashi | 62/123 |
| 4,592,768 A * | 6/1986 | Cutler et al. | 62/532 |
| 5,174,859 A * | 12/1992 | Rittof et al. | 162/29 |
| 5,660,055 A * | 8/1997 | Eriksson | 62/260 |
| 5,711,817 A | 1/1998 | Titmas | 127/37 |
| 5,755,975 A * | 5/1998 | Eck et al. | 210/714 |
| 5,879,637 A | 3/1999 | Titmas | 422/129 |
| 6,305,178 B1 * | 10/2001 | Shi et al. | 62/123 |

OTHER PUBLICATIONS

*Improving the Thermodynamic and Economic Efficiencies of Desalination Plants: Minimum Work Required for Desalination and Case Studies of Four Working Plants*; Mechanical Engineering, University of Nevada, Reno; Desalination and Water Purification Research and Development Program Final Report No. 78, Nov. 2003.

* cited by examiner

*Primary Examiner*—Peter A. Hruskoci
(74) *Attorney, Agent, or Firm*—Renner, Kenner, Greive, Bobak, Taylor & Weber

(57) ABSTRACT

A method for separating dissolved materials, including organic and inorganic solids and volatile constituents, from a liquid or aqueous solvent is disclosed. The method first extracts water from the flow stream being treated using a crystallization apparatus which freezes the water onto a continuous loop wire rope and withdraws the wire rope from the chamber containing the feed stream. The resultant concentrated solution is then subjected to a different process of evaporation by heating at reduced pressures resulting in the efficient separation of the materials in solution from the liquid medium while conserving energy. This procedure is considered highly effective in allowing for the concentration of the materials and then the extraction of the materials in solution and the recycling and reuse of the water or other liquid.

10 Claims, 4 Drawing Sheets

METHOD FOR EXTRACTION OF DISSOLVED TRACE MATERIALS FROM SOLUTION

TECHNICAL FIELD

The present invention is generally directed toward a method for the separation and removal of dissolved materials including dissolved solids and volatile constituents, from liquids such as water, and the apparatuses capable of performing various functions in the separation process. More particularly, the present invention is directed toward the effective integration of both cooling and heating processes for the effective internal recovery and recycling of heat energy from said processes. Specifically, the invention provides for the recovery and recycling of heat energy by controlling and directing the flow of energy from elements of heating to cooling vapors, liquids and solids.

BACKGROUND ART

In the processing of wastewater from industrial processes and wastewater treatment and the like, it has been a common practice simply to discharge the materials to the water, land and air rather than recover the materials for general recycled use. It has been long appreciated, however, that such methods of dealing with these situations are unsatisfactory for numerous and self-evident reasons. As a result of this appreciation, many industries have expended great effort in conducting research into altering the industrial processes to avoid creating the waste in the first place, or to limit its production. However, this adds costs to the industrial process, making the overall process less profitable.

As examples, in the process of converting municipal solid wastes to ethanol, as in U.S. Pat. No. 5,711,817, or in the hydrolysis of cellulosic material, as in U.S. Pat. No. 5,879,637, many valuable byproducts are lost to wastewater treatment because the products are dissolved in the water medium of a concentration too low to warrant the recovery of said products by existing means. Examples of such byproducts from acid hydrolysis that are present as dissolved volatile organic compounds or salts may include but not be limited to glycerol, exlose, levulinic acid, acetic acid, formic acid, furfural, lignin, lignin salts and urea.

Further, the accumulation of dissolved salts, such as urea and organic inhibitors such as furfural, inhibit the reuse of water in a closed loop by requiring recycled water blowdown or discharge to mitigate the accumulation of these inhibitors.

As an example, trace material from a fermentation procedure may be processed in a batch or continuous manner by evaporation, but requires an excessive amount of energy to evaporate large quantities of water. Hence, this evaporation procedure has failed to the extent that is not considered commercially useful. Moreover, the water extracted remains contaminated with volatile organic debris that was made to evaporate in proportion to the vapor pressure balance with water in part by the boiling procedure at or above atmospheric pressures.

The evaporation of water results in an inability to recover the heat of vaporization of the water. This limits the use of evaporation of water as a means of extracting materials of economic interest. Present methods do not integrate or orchestrate the use of cooling and heating in an integrated procedure to make the process adequately efficient to be useful.

Therefore, a need exists for a method of separating liquids such as water from volatile organic compounds and dissolved salts or the like, which method has the ability to recover and recycle heat energy and useful byproducts from the industrial and wastes processing operations.

DISCLOSURE OF THE INVENTION

It is therefore an object of the present invention to provide a method whereby trace dissolved solids and salts can be removed from water or other liquids, which method has a high thermal efficiency.

It is another object of the present invention, to provide a method, as above, in which there is a balance between cooling and heating.

It is a further object of the present invention to provide a method, as above, using the cooling in the extracted liquid to pre-cool incoming liquid and dissolved solids mixtures.

It is still a further object of the present invention to provide an apparatus that provides for the continuous formation of crystalline forms of water or liquids so as to remove and exclude at least a portion of the trace contaminants from the liquid.

It is yet a further object of the present invention to provide an apparatus, as above, which sustains the cleaning of the outside surface of the crystalline form of water in a continuous manner while limiting processed fluid mixtures from cross contamination.

It is still another object of the present invention to provide an apparatus, as above, which recovers the cleaned water for reuse in the process.

It is yet another object of the present invention to provide a separate or complementary apparatus that can recover volatile hydrocarbons dissolved in a liquid mixture while maintaining high thermal efficiency.

It is another object of the present invention to provide an apparatus that can recover useful by-products and useful decontaminated water.

At least one or more of the foregoing objects, together with the advantages thereof over known devices and methods shall become apparent from the specification which follows, and are accomplished by the invention as herein described and claimed.

In general, the present invention provides a method for separating at least one of dissolved inorganic materials and dissolved organic materials from a liquid solution, the method comprising subjecting a flow stream of the liquid solution to a chilled wire rope, whereby at least a portion of the liquid from the solution is frozen onto the wire rope; withdrawing the wire rope with the frozen liquid on it from the flow stream of the solution to effectively reduce the volume of the solution and increase the concentration of the dissolved materials in the flow stream of the solution; subjecting the concentrated liquid solution to heat at a pressure below atmospheric pressure to evaporate any organic materials from the solution; and to the extent that there is any dissolved inorganic materials in the concentrated liquid solution, bringing the further concentrated liquid solution to a point of saturation for at least one selected dissolved inorganic material under continuing evaporation conditions; and introducing a seed stock of the at least one selected dissolved inorganic material to the liquid solution, thereby causing the inorganic material to precipitate from the liquid solution.

The present invention also provide a crystallization apparatus for removing a liquid from a dilute solution containing dissolved materials, the apparatus comprising a continuous loop wire rope; a lower chamber for cooling the wire rope to a temperature below the freezing point of the dilute solution; an ice coating chamber for receiving the dilute solution, wherein at least a portion of the liquid from the dilute solution is frozen onto the wire rope; and an upper chamber for receiving the frozen liquid on the wire rope, the upper chamber adapted for collecting the frozen liquid off the wire rope.

PREFERRED EMBODIMENT FOR CARRYING OUT THE INVENTION

As noted hereinabove, the present invention generally relates to a method for separating dissolved materials, including organic and inorganic solids and volatile constituents, from a liquid (preferably, aqueous) solvent in a manner that is energy efficient and cost effective. Broadly, the present invention subjects a flow stream of a dilute solution of dissolved materials, including dissolved organic and/or inorganic compounds, to a process whereby liquid, preferably water, is extracted from the flow stream being treated using crystallization by freezing it, possibly at nominally elevated pressures, and carrying it away from the flow stream, and then subjecting the diluted, more concentrated flow stream to a different process of evaporation by heating at reduced pressures resulting in the efficient separation of the materials in solution from the liquid medium while conserving energy. This procedure is considered highly effective in allowing for the concentration of the materials and then the extraction of the materials in solution and the recycling and reuse of the water or other liquid.

Figure 1:
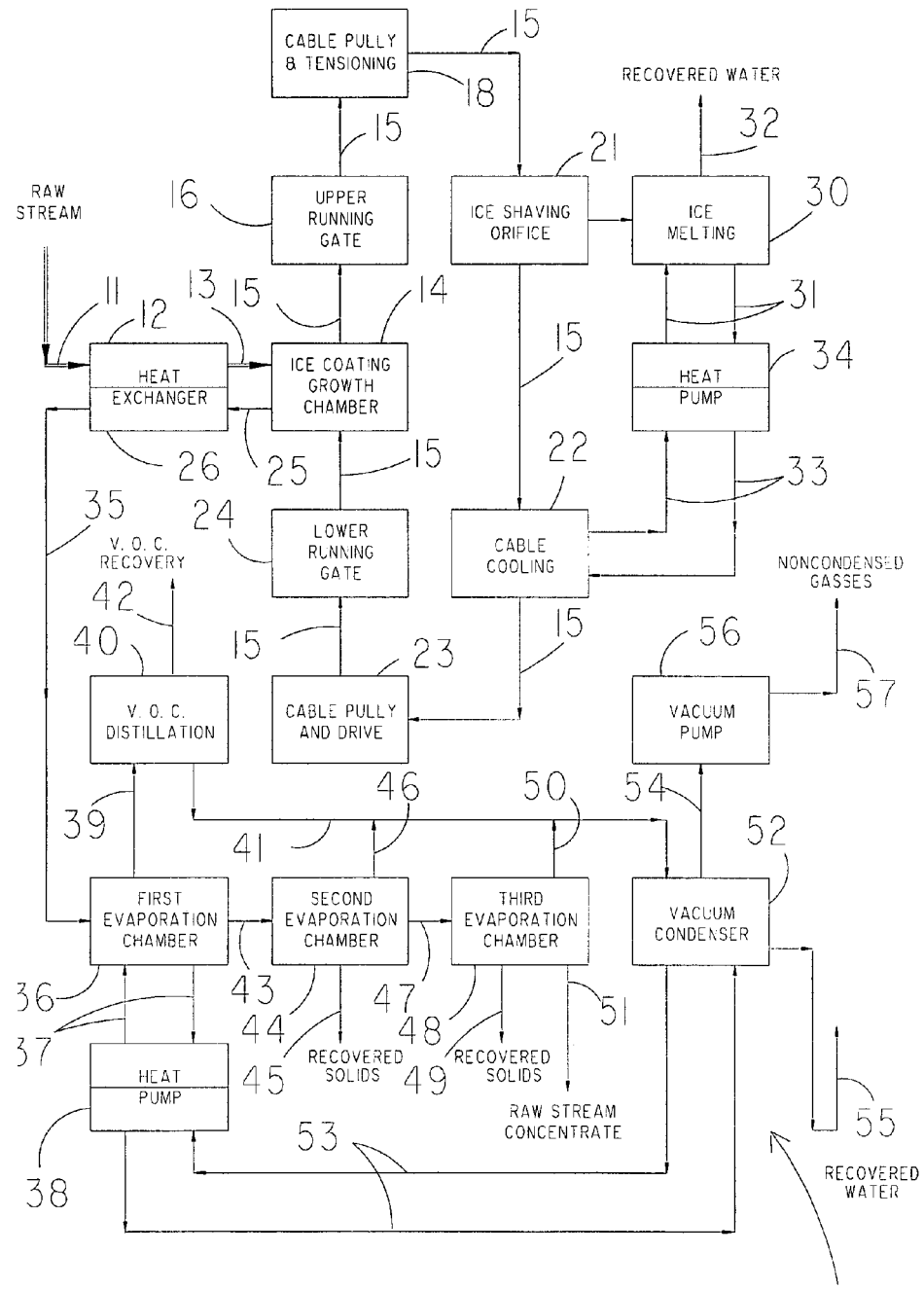
FIG. 1 is a representative schematic diagram of the interrelationships of the various cooling and heating apparatuses and parts according to the present invention.

A representative schematic diagram of the interrelationships of the various apparatuses employed in the concentration and separation process according to the present invention is generally indicated in FIG. 1 by the numeral 10. In particular, a flow stream such as a raw waste stream, (termed a RAW STREAM in FIG. 1) enters the process at 11 and is directed to heat exchanger 12 passing in counter-flow to pre-cooled outgoing fluids that have already undergone the cooling treatment as described herein. From the heat exchanger 12, the flow stream passes through inlet 13 to a chamber 14 having a moving wire rope 15. In the heat exchanger 12 and, to an even greater extent in chamber 14, the flow stream is cooled such that, in the chamber 14, the water or other liquid from the flow stream is used to cause ice to form on the metal surface of wire rope 15.

The wire rope 15 with the ice frozen to it then passes upward through a series of controlled barriers, shown in FIG. 1 as an upper running gate 16. This running gate 16 is more particularly described in FIG. 3B hereinbelow. Running gate 16 maintains the treated raw waste stream within chamber 14, since it will be appreciated that only the water from the raw waste stream solution coats the wire rope 15. The upper running gate 16 wipes by air flow the wire rope 15, rinses it, and again air wipes it once more before the wire rope 15 is directed over a pulley device 18 in the uppermost chamber of the apparatus, thereby ensuring that very little, if any, dissolved materials passes through running gate 16. It will be understood that the wire rope 15 is held in alignment through the running gate 16 by pulley 18.

Figures 2A, 2B:
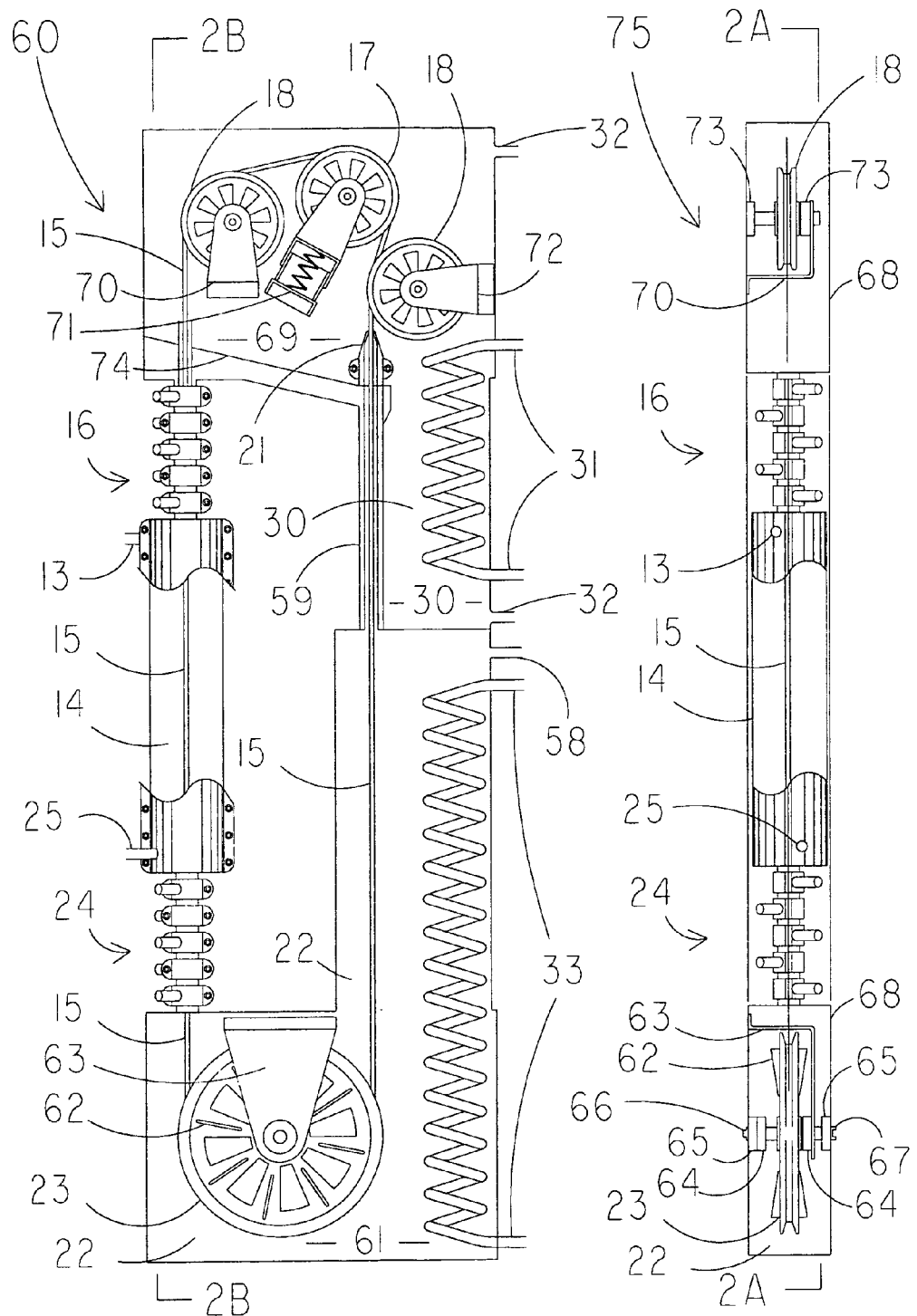
FIG. 2A is a partially sectioned, side elevational view of one portion of the crystallization apparatus embodying the concepts of the present invention.
FIG. 2B is a partially sectioned, elevational end view taken substantially along line 2B—2B of FIG. 2A.

With more particularity to the upper part of the cooling apparatus more particular seen in FIGS. 2A and 2B, the wire rope 15 is caused to pass through an orifice, such as ice shaving orifice 21, which removes the coating of ice on the wire rope 15 and causes the cleaned ice, i.e., the ice removed or shaved from the wire rope 15, to be removed to a chamber 30. In chamber 30, the ice is subjected to heating such as by fluids in conduits 31 from a source such as heat pump 34, thereby causing the ice to melt. Once melted, the recovered water can then be extracted as at 32.

Once the ice is shaved from the continuous loop wire rope 15, the wire rope 15 then continues into lower chamber 22 where cooling fluids in conduits 33 causes the wire rope 15 to be chilled again below the freezing point of the flow stream solution in chamber 14 to a degree whereby the moving wire rope loop becomes a cooling sink to extract sufficient heat from the flow stream solution in chamber 14 so as to cause ice to form once more on wire rope 15. More particularly, the wire rope 15 continues in lower chamber 22 and passes around pulley drive 23 to again align the wire rope 15 as it passes up through a lower running gate 24 more fully described in FIG. 3A. The lower running gate 24 includes an air seal mechanism to contain the pressure in the lower part of chilling chamber 14. The lower running gate 24 also is used to pre-coat wire rope 15 with a light dusting mist of clean water ice as well as to maintain the flow stream solution being treated in chamber 14. It will be appreciated that the flow stream solution will become more and more concentrated as the wire rope 15 removes from the chamber 14 more and more water from the flow stream being treated. Thus, the flow stream of raw waste solution that entered chamber 14 at inlet 13 and was cooled to its freezing point, now exits chamber 14 at outlet 25, passing through heat exchanger at 26 in counter-flow to the warmer, incoming raw waste stream from flow path 11, thereby reheating the exiting, more concentrated solution in preparation for further treatment.

It has been found that employing this cooling/freezing process permits the removal of a large volume of water from the flow stream with significant efficiency. By employing the cooling process described above and removing the excess water, the flow stream solution preferably increases its concentration at least 3 fold and more preferably, at least 10 fold. Moreover, the process allows for the effective recovery of the water separated from the raw waste solution. It will be understood however that the concentration should not be increased so much that precipitation of the dissolved materials begins in the chamber 14. Any precipitation of the materials should take place during the evaporation process described hereinbelow.

Figure 4:
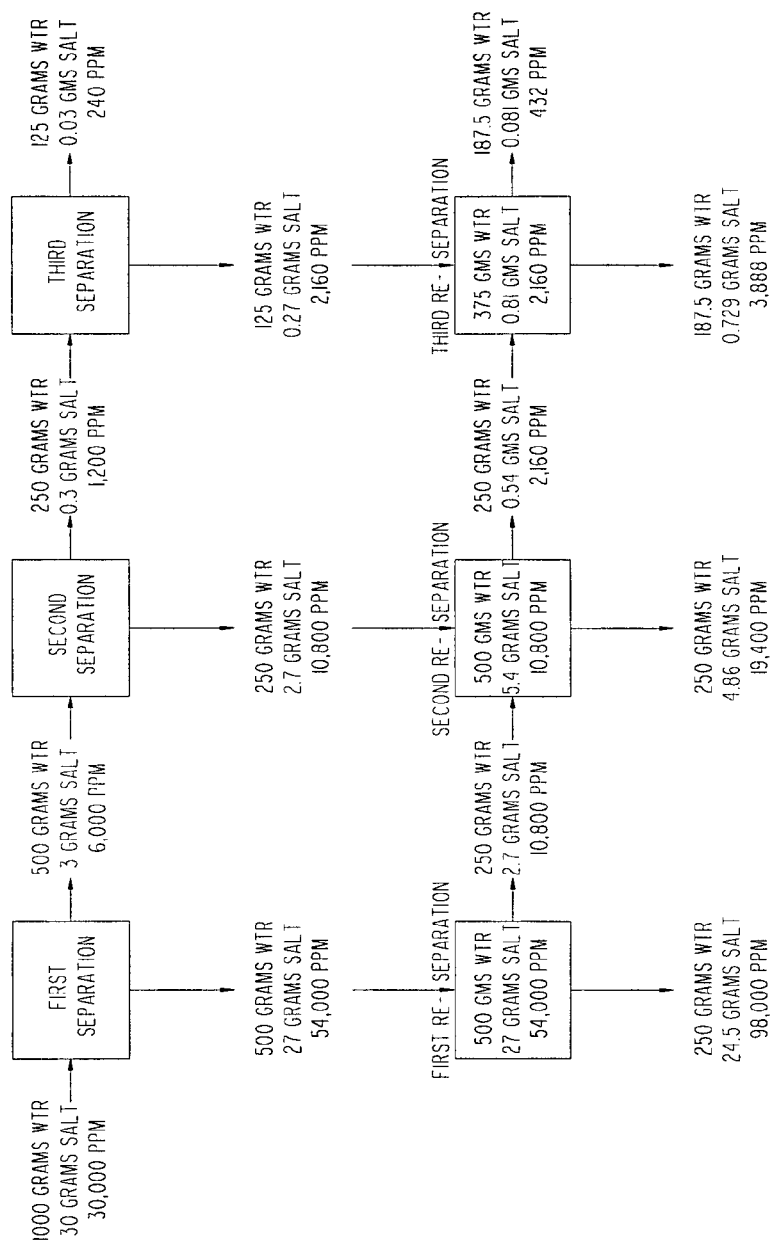
FIG. 4 is a representative schematic illustration of a 10:1 salt reduction in a matrix of six units with a 50—50 split in flow.

As an example of how the flow stream becomes more concentrated using this cooling/freezing procedure, FIG. 4 illustrates a 10:1 salt reduction in a matrix of six units with a 50—50 split in flow. In actuality, it is believed that more than 50% of the water could be extracted from the flow stream, depending upon several factors, inter alia, the wire rope material, the wire rope diameter and size, the degree of pre-chilling, the process flow rate, and the size of the chamber 14.

For example, essentially any metal can be used as the wire rope. Silver, copper or aluminum may all have benefits or drawbacks. Some metals may have a lower chill content per pound than others, but may have a higher internal rate of heat transmission that would transfer the exchange of heat, and thus, the fusion of water at a higher rate. The corrosion resistance of the wire rope, its flexibility, strength and durability may also be considerations.

The diameter of the wire rope is also important. By making the wire rope larger in diameter, water can be fused to ice at a higher rate. Moreover, the wire rope could travel at a faster rate, thereby allowing more weight of chilled metal to be exposed to the flow stream to be treated. A smaller diameter wire rope has a larger heat transfer surface area per foot per pound of wire rope, which may also be desirable. The faster the wire rope travels, the better mixing that occurs. This reduces the film thickness of the fluid on the wire rope which would enhance the rate of heat transfer form the wire rope to the water, enhancing ice formation.

The degree of chilling of the wire rope, preferably anywhere from 2 degrees to 30 degrees F. below the freezing point of the flow stream to be treated would also impact the amount of ice formed. Also, the flow rate of the flow stream into the chamber 14 impacts the ratio of the amount of water and dissolved materials that leaves chamber 14 compared to the amount of clean ice that leaves the chamber.

It is important to note that the flow stream entering the chamber 14 preferably should be pre-chilled to very close to its freezing point. Otherwise, the pre-chill of the wire rope would be dissipated just chilling the liquid in the chamber 14 without any chilling capacity left in the wire rope for ice formation on the surface of the wire rope.

Returning to FIG. 4, it will be appreciated that the style of this illustrated schematic diagram is a mass balance. That is, at each stage tracking the total amount of water, weight of dissolved materials (i.e., solids), and concentration. By sequencing six separation units according to concentration, eventually it can be seen that even though the initial yield of water below the salt taste threshold (i.e., roughly 300 ppm) is low at 12.5% at the upper right, by using a fourth separation and a fourth re-separation, and so forth, eventually a significant percentage yield of "cleaned" water can be achieved. The ratios of flow split and reduction efficiency given here are hypothetical, and will vary in practice based upon many of the parameters discussed above, but the principle that the amount of water will decrease in the flow stream, thereby increasing the concentration of the dissolved materials therein, remains. A more concentrated the stream will allow less energy use to boil off water to accommodate the extraction of the dissolved solids and other materials as described hereinbelow.

For further treatment, the greatly more concentrated flow stream of raw waste solution exits heat exchanger 26 and advances via conduit 35 to a first evaporation chamber 36 that is at a pressure below that of atmospheric pressure and is heated by conduits 37 delivering heat from heat pump 38. Upon heating at this reduced pressure, an evaporated mixture of water vapor and volatile organic compounds is produced. This evaporated mixture is directed via conduit 39 to a fractional distillation device 40 served by a vacuum header 41. Extracted vapors condensed by selected temperature control as is well known in the art may thus exit the process as at outlet 42 for materials recovery.

Subsequent to evaporation, the even further concentrated flow stream solution, including dissolved inorganic solids with various volatile organic compounds removed, then advances via conduit 43 to a second evaporation chamber 44 wherein the flow stream solution is brought to the point of saturation for a selected dissolved inorganic solid. A seed stock of the selected inorganic solid is introduced into the second evaporation chamber 44 during continuing evaporation causing the inorganic solids to adhere to the seeded stock, thereby precipitating the inorganic solids in fluid suspension. Since the precipitated materials are now larger, they become readily precipitated, settled solids. Such solids may then be extracted from chamber 44 as at 45 for recovery.

Chamber 44 may also be serviced by a vacuum header 41 as at communication 46 to reduce the pressure in chamber 44. Chamber 44 also retains adequate heat for evaporation from chamber 36. The vapor pressure of chamber 44 may be less than that of chamber 36 using controls known to the engineering arts.

The flow stream of raw waste solution, now further depleted of inorganic solids, advances via conduit 47 to yet a third evaporation chamber 48. This chamber 48 also retains the residual heat from chamber 36 and chamber 44. Like chamber 44, chamber 48 maintains the flow stream solution at a reduced operating pressure by connection via communication 50 to the vacuum header 41. That is, as with chamber 44, the evaporation of water continues until saturation conditions are satisfied for the next selected inorganic dissolved solid. Once the solution reaches that saturation level, the solution is again seeded with particles of the dissolved inorganic solid to be removed by precipitation via 49. To the extent a flow stream of solution continues to exist, the process may be repeated for any further inorganic solids as deemed necessary to achieve cost effective materials recovery. That is, the flow stream would communicate with the next evaporation chamber (not shown) via conduit 51, and would continue until all necessary solids have be effectively recovered.

The vacuum header 41 may be serviced by a condensing chamber 52, which is cooled by heat pump 38 via conduits 53. Any condensed water with reduced inclusions of organic dissolved materials may be extracted by any means known in the art with a continuous trap removal mechanism indicated for this embodiment as at 55 for the point of water extraction. The vacuum condenser 52 is serviced via conduit 54 by a vacuum pump 56 which will involve an outlet 57 for non-condensed gasses, which may be elected for further treatment as is known in the engineering arts.

As noted above, FIGS. 2A and 2B are enhanced, partially sectioned, elevational views of one embodiment of a crystallization apparatus made in accordance with the concepts of the present invention. The embodiment provides a means for concentrating a flow stream of dilute solution containing dissolved materials therein via ice crystallization using a continuous wire rope loop 15. As noted previously, ice is formed on the wire rope 15 within the ice coating chamber 14, passed through an upper running gate 16, over a set of pulleys 17,18, to a mechanism for shaving or otherwise removing the ice from the wire rope 15. Once shaved, the ice is melted in chamber 30 and can be effectively recovered therefrom. The wire rope 15 is then recooled to below the freezing point of the flow stream of dilute solution, passed around another pulley 23, and reenters chamber 14 from lower running gate 24.

A crystallization apparatus embodying the concepts of the present invention is generally indicated by the numeral 60 in FIG. 2A. The lower cooling chamber, designated generally by the numeral 61 in FIG. 2A, houses a drive pulley 23 acting upon and centering the continuous loop wire rope 15. In this view the direction of motion for pulley 23 is clockwise. Cooling of the chamber 61 is provided by coils of chilled fluids in conduits 33. Vanes to provide turbulence and for the mixing of chilled air in chamber 61 are provided by vanes 62 on pulley 23. Pulley 23 is supported by stanchion 63 so configured as to allow the continuous loop wire rope 15 to be installed in a prefabricated manner. As the wire rope 15 moves through chamber 61 sufficient heat is extracted from wire rope 15 to cause the moving wire rope 15 to act as a heat sink, causing the water to freeze onto the wire rope surface. When fully chilled, wire rope 15 passes up through the lower running gate, generally indicated as 24 in FIG. 2A and FIG. 3A. The running gate 24 acts as an open seal which relies on air pressure delivered in the running gate 24 to pressurize chamber 61 as will be described in FIG. 3A and prevent fluids or the flow stream solution to be treated in chamber 14 from moving downward into chamber 61. Chamber 61 is likewise served by an air release provision as at 58 to allow sustained and controlled conditions of temperature and very low humidity. Chamber 61 is pressurized to accommodate higher heat transfer rates from the wire rope 15 and from chamber 61 into chilling coils served by conduits 33.

The wire rope 15 then advances into the ice coating and ice growth chamber 14 where the chilled wire rope 15 is contacted by the raw waste flow stream introduced to chamber 14 at inlet 13. The raw waste flow stream to be treated is thus mixed in chamber 14, in contact with wire rope 15. As noted above and described further below, wire rope 15 withdraws water from the flow stream by allowing the water from the flow stream to be frozen to the chilled wire rope 15. Thus, the raw waste flow stream loses water and becomes increasingly more concentrated with organic and inorganic materials such that, at some point, the flow stream is deemed to be sufficiently treated to exit chamber 14 at outlet 25.

Figure 3A:
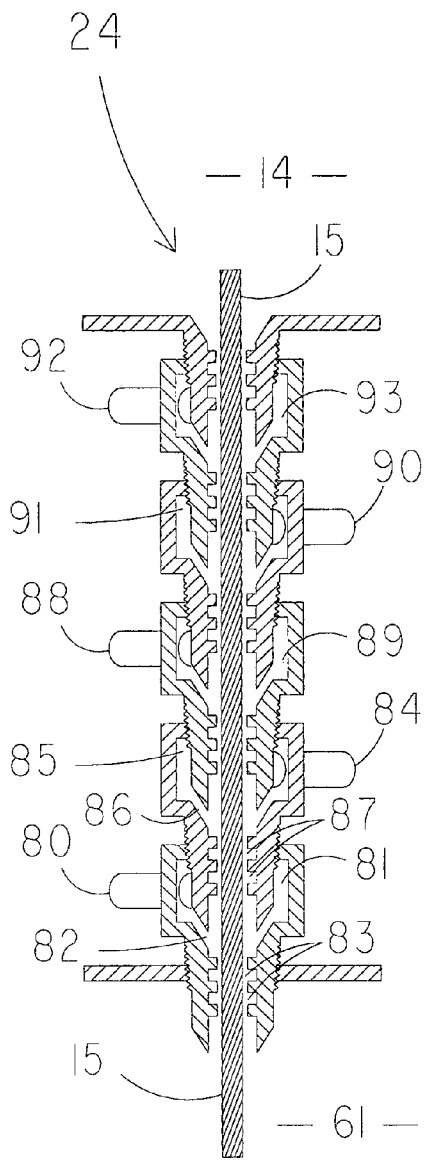
FIG. 3A is a cross-sectional view of the lower cleaning and isolation device referred to as a lower running gate in FIG. 1 and shown in FIG. 2A and FIG. 2B.
Figure 3B:
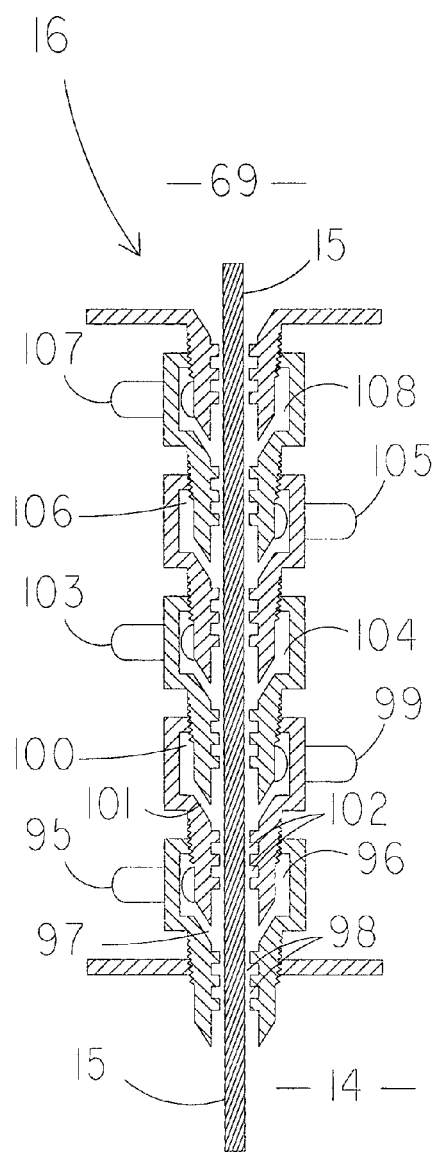
FIG. 3B is a cross-sectional view of the upper cleaning and isolation device referred to as an upper running gate in FIG. 1 and shown in FIG. 2A and FIG. 2B.

After collecting a coating of clear ice from the flow stream solution in chamber 14, the wire rope 15 advances upwards in a continuous motion through the upper running gate, generally indicated as 16 in FIGS. 2A and 3B. In running gate 16, the wire rope passes through air curtain wipes more specifically illustrated as in FIG. 3B. The wire rope 15, continuing in its upward motion, then enters the upper chamber of the crystallization apparatus designated generally by the numeral 69 in FIG. 2A. The alignment of wire rope 15 is maintained via pulley 18 that is supported by stanchion 70 housed in upper chamber 69, which stanchion 70, in a like manner to stanchion 63, accommodates the placing of the loop wire rope 15. Tensioning mechanism for the wire rope 15 may also be housed in the upper chamber 69. For instance, pulley 17 may be equipped with a tension device as at 71. A second pulley 18 supported by stanchion 72 in upper chamber 69 also aligns the wire rope 15 to pass through the ice stripping orifice 21 the opening of which is restricted so as to cause any remaining ice skin that may not have come off through pulleys 17 and 18 to be removed from wire rope 15. It will be understood that chamber 69 is maintained generally at a lower pressure than chamber 61 so as to preclude moisture vapors from the warmer chamber 69 from entering the dry but chilled chamber 61. Pieces of ice will typically fall from wire rope 15 upon bending of the wire as it goes over the pulleys 17,18. When this happens, the ice falls onto surface 74 that guides the ice to an ice melt recess chamber 30. Of course, should any ice remain on the wire rope 15, it is shaved by the ice shaving orifice 21 such that the shaved ice also is guided to the ice melt recess chamber 30. A heat source to melt the ice is provided via heating coils served by conduit 31 that communicates with the heating side of a conventional heat pump 34 as schematically shown in FIG. 1, and the recovered water is then removed via outlet 32.

After passing through the ice stripping orifice 21, the de-iced wire rope 15 continues through a passageway 59 which is an extension of chamber 61. The movement of wire rope 15 is continuous as is the extraction of ice from chamber 14. It is well known that this method of ice crystallization precludes the incorporation of inorganic or organic dissolved substances in water, and thus, only substantially clean water is extracted from the raw waste flow stream. Moreover, due to water being extracted from the flow stream, the raw waste flow stream is reduced in volume and concentrated for further treatment. The use of the heat pump is indicated as it is a means by which specific temperatures can be sustained on either the hot or the cold side of the heat pump, and water to water heat pumps can transfer as much as eight times the British Thermal Units from hot to cold sides as are needed to operate the heat pump.

FIG. 2B illustrates a different view of the crystallization apparatus seen in FIG. 2A. In FIG. 2B, the modular form of the ice crystallization method and apparatus can be seen. Each of these repeating modules generally indicated as 75 in FIG. 2B can be arranged side by side and served by floor and overhead slots to accommodate removal for service or installation. The drive pulley 23 with its mixing vanes 62 are shown, as is the supporting stanchion 63. Further illustrated in this view are supporting bearings 64 and seals 65 to allow the drive shaft to pass through the module walls. Module side 68 is removable to access and service the apparatus and the wire rope 15. The tangential nature of feed inlet 13 and extraction outlet 25 are illustrated. In FIG. 2B, the upper alignment pulley 18 can be seen with its supporting stanchion 70 and supporting bearings 73.

In FIG. 3A, the lower running gate, depicted generally as 24, is further detailed and illustrated as to its configuration and function. The running gate is of split construction to allow its placement after the wire rope 15 is in place. The running gate is set up in various stages stacked upon each other in order to provide various functions as discussed below. Once aligned by the pulley 23, the wire rope 15 passes upward from chamber 61 entering the first stage 81 of the lower running gate 24. There, chilled air or an expanding gas such as dry carbon dioxide enters stage 81 via inlet 80 and creates a moving air wipe through passage 82 in counter-flow against moving wire rope 15. Gasses from passage 82 then pass down along wire rope 15 and are restricted or flow restrained by orifices 83. Continuing upward, the next stage 85 of the running gate 24 is served by a gas extraction outlet 84 which draws gasses past wire rope 15 via the orifice sets 87. In running gate stage 89 a water vapor mist is introduced via nozzle 88 to cause a very thin film of ice to form against the surfaces of wire rope 15. This thin film of ice on the wire rope 15 allows for crystallization growth of ice from the flow stream solution while the wire rope 15 is in chamber 14. The next stage 91 of the running gate is an additional low pressure evacuation zone served by communication 90 and draws from both stages 89 and 93. Stage 93 of the running gate is pressurized to the degree required to preclude the flow stream solution in chamber 14 from passing downward through running gate 24 and into chamber 61. Stage 93 of the running gate 24 is to be pressurized before chamber 14 is flooded with the flow stream solution. In this manner a running seal is created to accommodate the continuous and unrestricted movement of wire rope 15 while sustaining segregation of fluids.

In FIG. 3B, the upper running gate, depicted generally as 16, is further detailed and illustrated as to configuration and function. The upper running gate 16, like lower running gate 24, is also of split construction to allow for its placement after the wire rope 15 is in place, and is provided in stacked stages for its effective use. The wire rope 15 passes upward from chamber 14 now coated with an accumulated and uniform covering of clear ice, albeit coated on its surface with contaminants from chamber 14. The lowest or first stage 96 of running gate 16 includes a vacuum extraction nozzle 95 that tends to remove surface film from the ice coating on wire rope 15 via passages 97. Orifices 98 serve to deter surface solution from entering the running gate 16.

The second stage of the upper running gate 16 has an air pressurized chamber 100 served by inlet 99 directing air flow through passage 101 and against the upwardly moving wire rope 15 resulting in a moving air wiping of the surface of the ice on wire rope 15. The resistance to air flow along the surface of the ice on the wire rope 15 is further accommodated by the orifice group 102 as air passes downwardly against the wire rope 15 upwards motion as air moves to chamber 96 for evacuation. In similar fashion, low pressure chamber 104 is served by evacuation communication 103 and a second pressurized air wipe is introduced at the next stage of the running gate as at 106 served by air supply inlet 105. The final stage 108 of the upper running gate 16 provides a boost of air pressure to further cleanse the ice surface via communication 107 and be the source of air pressure to accommodate the service needs of upper chamber 69. Each of the air supplies 99, 105, and 107 are chilled so as not to allow the premature melting of the ice skin on the continuously moving wire rope 15. It will also be appreciated that additional stages could be employed for providing additional air supplies or evacuation of air portals.

Based upon the foregoing disclosure, it should now be apparent that the use of a method for extracting and/or separating soluble materials from a dilute water or fluid stream as described herein will carry out the objects set forth hereinabove. It is, therefore, to be understood that any variations evident fall within the scope of the claimed invention and thus, the selection of specific utilization of this separation method and its related apparatus, its operating conditions and the like, can be determined without departing from the spirit of the invention herein disclosed and described. Thus, the scope of the invention shall include all modifications and variations that may fall within the scope of the attached claims.

What is claimed is:

1. A method for the separation of at least one of dissolved inorganic materials and dissolved organic materials from a liquid solution, the method comprising:

subjecting a flow stream of the liquid solution to a chilled wire rope, whereby at least a portion of the liquid from the solution is frozen onto the wire rope;

withdrawing the wire rope with the frozen liquid on it from the flow stream of the solution to effectively reduce the volume of the solution and increase the concentration of the dissolved materials in the flow stream of the solution, thereby providing a concentrated liquid solution;

subjecting the concentrated liquid solution to heat at a pressure below atmospheric pressure to evaporate any organic materials from the concentrated solution, thereby providing a further concentrated liquid solution; and for any remaining dissolved inorganic materials in the further concentrated liquid solution, bringing the further concentrated liquid solution to a point of saturation for at least one selected dissolved inorganic material under continuing evaporation conditions; and introducing a seed stock of the at least one selected dissolved inorganic material to the liquid solution, thereby causing the selected inorganic material to precipitate from the liquid solution.

2. The method according to claim 1, wherein said liquid solution is an aqueous solution.

3. The method according to claim 1, further comprising recovering the frozen liquid from the wire rope.

4. The method according to claim 3, wherein the step of recovering the frozen liquid includes shaving the frozen liquid from the wire rope.

5. The method according to claim 4, wherein the step of recovering the frozen liquid includes melting the frozen liquid once removed from the wire rope.

6. The method according to claim 1, wherein the wire rope is a continuous loop.

7. The method according to claim 1, wherein withdrawing the wire rope from the flow stream of the solution increases the concentration of the solution by at least three fold.

8. The method according to claim 1, wherein withdrawing the wire rope from the flow stream of the solution increases the concentration of the solution by at least ten fold.

9. The method according to claim 1, wherein the concentrated solution contains at least one inorganic material.

10. The method according to claim 9, wherein the concentrated solution contains at least a second inorganic material, and further comprising the step of bringing the further concentrated liquid solution to a point of saturation for the second selected dissolved inorganic material under continuing evaporation conditions; and introducing a seed stock of the second selected dissolved inorganic material to the liquid solution, thereby causing the second selected inorganic material to precipitate from the liquid solution.

* * * * *